United States Patent [19]
Blanchet et al.

[11] Patent Number: 5,766,559
[45] Date of Patent: Jun. 16, 1998

[54] EXHAUST GAS MANAGEMENT APPARATUS AND METHOD

[75] Inventors: Scott Christopher Blanchet, Grand Blanc; Wayne Richard Moore, Goodrich, both of Mich.

[73] Assignee: General Motors Corporation, Detroit, Mich.

[21] Appl. No.: 797,545

[22] Filed: Feb. 3, 1997

[51] Int. Cl.$^6$ .............................. B01D 53/34; F01N 3/28
[52] U.S. Cl. ................ 422/171; 422/169; 422/170; 422/177; 422/179; 422/180; 422/176; 60/284; 60/285; 60/288; 60/289; 60/297
[58] Field of Search .................. 422/169–170, 422/171, 177, 176, 180, 179, 172, 174; 60/284–285, 297, 299, 293, 289, 288; 428/116, 592–594; 502/439, 527

[56] References Cited

U.S. PATENT DOCUMENTS

| | | | |
|---|---|---|---|
| 3,662,540 | 5/1972 | Murphey | 422/171 |
| 4,886,711 | 12/1989 | Foldvary | 428/592 |
| 5,315,824 | 5/1994 | Takeshima | 422/170 |
| 5,525,308 | 6/1996 | Öser | 422/171 |

FOREIGN PATENT DOCUMENTS

| | | |
|---|---|---|
| 0697505 A1 | 2/1996 | European Pat. Off. . |
| 0 763 651-A1 | 3/1997 | European Pat. Off. . |

OTHER PUBLICATIONS

In–Line Hydrocarbon Absirber System for ULEV, M. D. Patil, W. Hertl, J. W. Williams & J. N. Nagel; SAE Technical Paper Series #960348, Feb. 26–29, 1996.

*Primary Examiner*—Hien Tran
*Attorney, Agent, or Firm*—Anthony Luke Simon

[57] ABSTRACT

An exhaust gas management apparatus including: an air flow directing body forming a bypass passage including an inlet end and an outlet end and defining a low pressure region between the inlet end and the outlet end having a first diameter less than second and third diameters of the inlet and outlet ends, respectively; a hydrocarbon adsorber mounted radially exterior of the air flow directing body; an air source located downstream in an exhaust flow path of the low pressure region of the air flow body; and an air pump forcing air through the air source wherein, during activation of the pump, the bypass passage is valved shut at the low pressure region, wherein less air is required to valve shut the bypass passage than would be required at another location within the bypass passage.

6 Claims, 4 Drawing Sheets

EXHAUST GAS MANAGEMENT APPARATUS AND METHOD

This invention relates to an exhaust gas management apparatus and method.

BACKGROUND OF THE INVENTION

It is known to provide a hydrocarbon adsorber located between two catalyst substrates in a catalytic converter. The hydrocarbon adsorber is provided with a bypass passage, such as a central opening through the surrounding monolith structure. The bypass passage does not significantly affect gas passing therethrough while the monolith structure surrounding the bypass passage contains material that absorbs hydrocarbons from gasses passing through the monolith structure as long as the monolith is below a predetermined temperature. The bypass passage is valved shut by an air valve immediately after vehicle start-up, forcing exhaust gasses to travel through the hydrocarbon-absorbing monolith structure of the adsorber. The adsorber absorbs hydrocarbons from the exhaust gas passing through the monolith. When the catalyst substrate upstream of the adsorber reaches light-off temperature and begins the desired catalytic activity on the exhaust gases, engine exhaust gas is allowed to bypass the hydrocarbon-absorbing monolith by flowing through the central opening in the monolith forming the bypass passage. The exhaust gas continues heating the catalyst substrate downstream of the hydrocarbon adsorber to light-off temperature.

When the hydrocarbon adsorber reaches a temperature at which it releases the hydrocarbons stored therein, those hydrocarbons are ideally oxidized in the downstream converter into more desirable species of exhaust gas. If necessary, supplemental air is provided by the air valve to allow appropriate oxidation of the hydrocarbons passing through the second catalyst substrate.

It has been suggested to control the air flow into the air valve so that, as engine speed increases, air to the air valve decreases, allowing more exhaust gas to bypass the adsorber, i.e., through the central opening, to more quickly heat up the second catalyst substrate. This control strategy, however, fails to optimize performance of the catalytic converter in which the hydrocarbon adsorber is included because it allows hydrocarbons to bypass the adsorber before the first catalyst substrate reaches light off temperature.

SUMMARY OF THE INVENTION

It is an object of this invention to provide an exhaust gas management apparatus.

Advantageously, this invention provides an exhaust gas management apparatus including a hydrocarbon adsorber with an axial bypass opening that provides more efficient transfer of exhaust gases through the bypass opening.

Advantageously, this invention provides an exhaust gas management apparatus and method including a hydrocarbon adsorber with an improved bypass passage that allows more efficient implementation of an air valve for controlling flow through the hydrocarbon adsorber, thus allowing full control of air flow through the hydrocarbon adsorber while reducing the amount of air necessary to be pumped through the air valve.

Advantageously, this invention provides an exhaust gas management apparatus and method with improved temperature management thus making more efficient use of a hydrocarbon adsorber structure and allowing more time for a downstream catalyst to reach light off temperature before the hydrocarbon adsorber reaches temperatures at which it releases stored hydrocarbons.

Advantageously, this invention provides an exhaust gas management apparatus and method that provides new air flow control for the hydrocarbon adsorber to maximize efficiency of the hydrocarbon adsorber in the exhaust flow management apparatus.

Advantageously, according to a preferred example of this invention, the exhaust gas management apparatus includes a hydrocarbon adsorber with an air flow control body mounted within an opening in the hydrocarbon adsorber. The air flow control body is provided with a shape that has a minimum diameter section creating a low fluid pressure region between the first and second ends of the air flow control body. The air flow body does not inhibit air flow therethrough because a stable diffuser is created between the low pressure region and the exit to the air flow body. A source of valving air is provided downstream of the low pressure region and the source injects air toward the low pressure region.

Advantageously, this invention recognizes that the amount of air necessary to valve shut an air passage is directly related to the diameter of the passage that needs to be valved shut. By using an air flow body that creates a low pressure point at a minimum diameter position along the body, this invention reduces the diameter of the bypass passage for the hydrocarbon adsorber at a point along the length of the bypass passage without increasing air flow restriction. At the same time, the reduced diameter portion allows implementation of the downstream air source that projects air flow to close the bypass passage at the reduced diameter portion. Since the air source is positioned to close the bypass passage at the reduced diameter portion, less air is required to be injected through the nozzle and close the bypass passage, thus, reducing the amount of air needed to valve the bypass passage closed.

Advantageously, the air flow body within the hydrocarbon adsorber also defines an annular insulating zone between the air flow body and the surrounding hydrocarbon adsorber. This insulation zone reduces the transfer of heat of exhaust gasses flowing through the bypass passage to the hydrocarbon adsorber. An advantage provided by the reduced heat transfer is that, during vehicle operation, once the bypass passage is valved open, the insulation zone minimizes the amount of heat transferred from the exhaust gasses traveling through the bypass passage to the adsorber, maintaining more heat in the exhaust gasses to heat the downstream catalyst substrate while also slowing the heating of the hydrocarbon adsorber to a point where the stored hydrocarbons are released. The advantage of this result is that the downstream catalyst substrate reaches light off temperature more quickly than in prior systems while the hydrocarbons stored in the adsorber before light off of the upstream catalyst remain stored for a longer period. The combination of these two benefits operate together to minimize the potential for release of stored hydrocarbons before light off of the downstream catalyst substrate.

Advantageously, according to a preferred example, this invention controls the rate of air flow forced through the air source to valve shut the bypass valve in response to the rate of mass air flow through the vehicle engine. This allows dynamic adjustment of the rate of air flow through the air source in response to engine conditions to maintain the bypass passage valved optimally closed when it is desired that the valve be closed while at the same time preventing introduction of excess air into the hydrocarbon adsorber monolith during start-up condition of the vehicle.

Advantageously, this invention recognizes that it is important to prevent excess air from being introduced into the hydrocarbon adsorber monolith in the periods immediately following engine start-up. More particularly, the efficiency of the hydrocarbon absorbing material, such as a known zeolite, in the hydrocarbon adsorber is related to the temperature of the hydrocarbon adsorber and the partial pressure of hydrocarbon in the exhaust gasses flowing through the adsorber. If excess air is introduced into the exhaust gasses flowing through the hydrocarbon adsorber, the partial pressure of hydrocarbons in the exhaust gasses is reduced by the presence of the excess air, resulting in less hydrocarbons being absorbed by the adsorber.

Advantageously then, according to a preferred example, this invention provides an exhaust gas management apparatus comprising: an air flow directing body forming a bypass passage including an inlet end and an outlet end and defining a low pressure region located between the inlet end and the outlet end and having a first diameter less than second and third diameters of the inlet and outlet ends, respectively; a hydrocarbon adsorber mounted radially exterior of the air flow directing body; an air source located downstream in an exhaust flow path of the low pressure region of the air flow body; and an air pump capable of forcing air through the air source wherein, during activation of the pump, the bypass passage is valved shut at the low pressure region, wherein less air is required to valve shut the bypass passage than would be required at another location within the bypass passage, wherein, when the bypass passage is valved open, an unrestricted air flow is provided to the exhaust gasses.

BRIEF DESCRIPTION OF THE DRAWINGS

The present invention will now be described by way of example with reference to the following drawings in which.

DESCRIPTION OF THE PREFERRED EMBODIMENT

Figure 1:
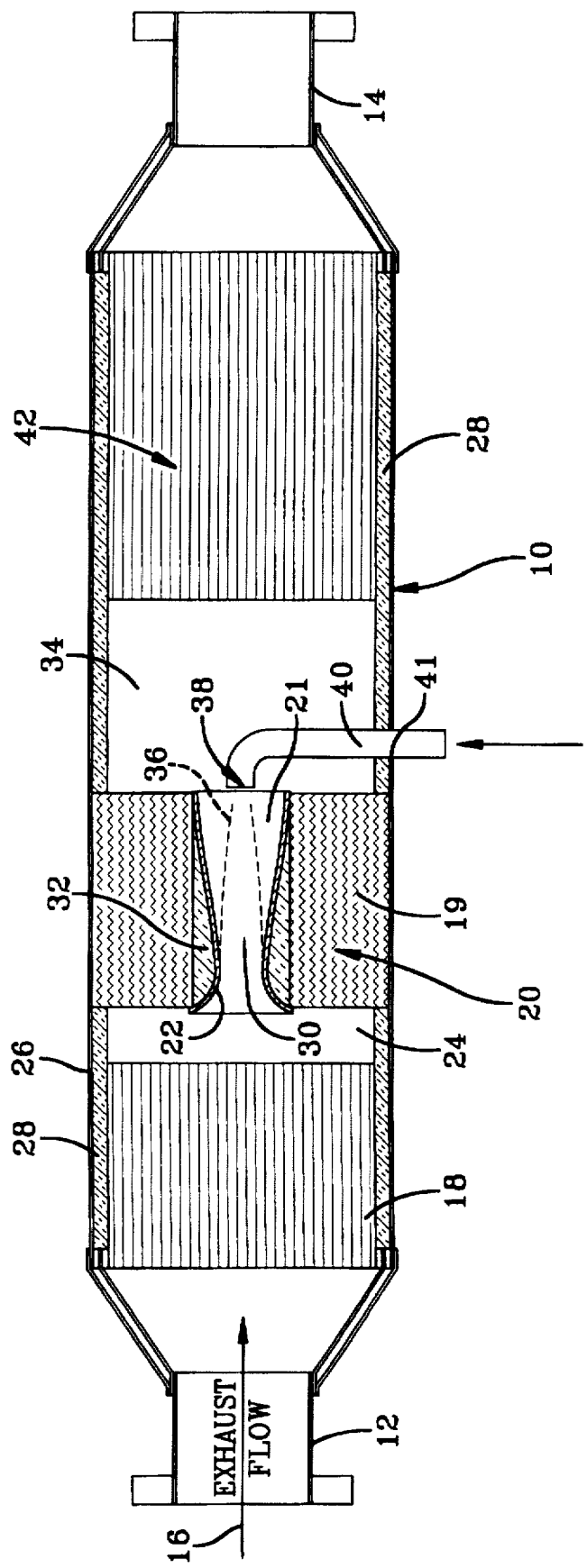
FIG. 1 illustrates a vehicle catalytic converter including an example exhaust gas management apparatus according to this invention.

Referring now to FIG. 1, catalytic converter 10 has an inlet 12 in which exhaust gas flows in the direction of arrow 16 from a vehicle engine and exhaust manifold. In the catalytic converter 10, the exhaust gas flows through the first catalyst substrate 18, the hydrocarbon adsorber 20 and second catalyst substrate 42. The catalyst substrates 18 and 42 are maintained in place within the catalytic converter housing 26 by a known substrate retention material 28. In an example in which adsorber 20 has a metal monolith structure, the adsorber 20 may be brazed directly to the inside surface of housing 26 between regions 24 and 34. In an example in which adsorber 20 has an extruded ceramic, foam or other type of monolith structure, the adsorber 20 may be held in place by a suitable heat-conductive retention material, such as metal mesh or foil. Whether the adsorber substrate is metal or ceramic, it is desirable that the adsorber have a high thermal mass to increase heating time of the adsorber after vehicle cold start-up.

Open end 38 of air source pipe 40 is the source of the air (reference 36) for the air valve for controllably closing and opening the bypass passage 21 formed by air flow directing body 22. The air source pipe 40 is sealingly mounted within opening 41 in the catalytic converter housing 26. For example, the pipe 40 may be welded in place by a circumferential weld that seals the interface between the housing 26 and the pipe 40. The open end 38 is located between the hydrocarbon adsorber 20 and the downstream catalyst substrate 42 and is pointed upstream into the bypass passage 21. Insulation 32 is placed between the body 22 and the substrate (monolith structure) 19 of the adsorber 20, minimizing the heat transfer from gasses flowing through the bypass passage 21 to the hydrocarbon adsorber 19.

Figure 2:
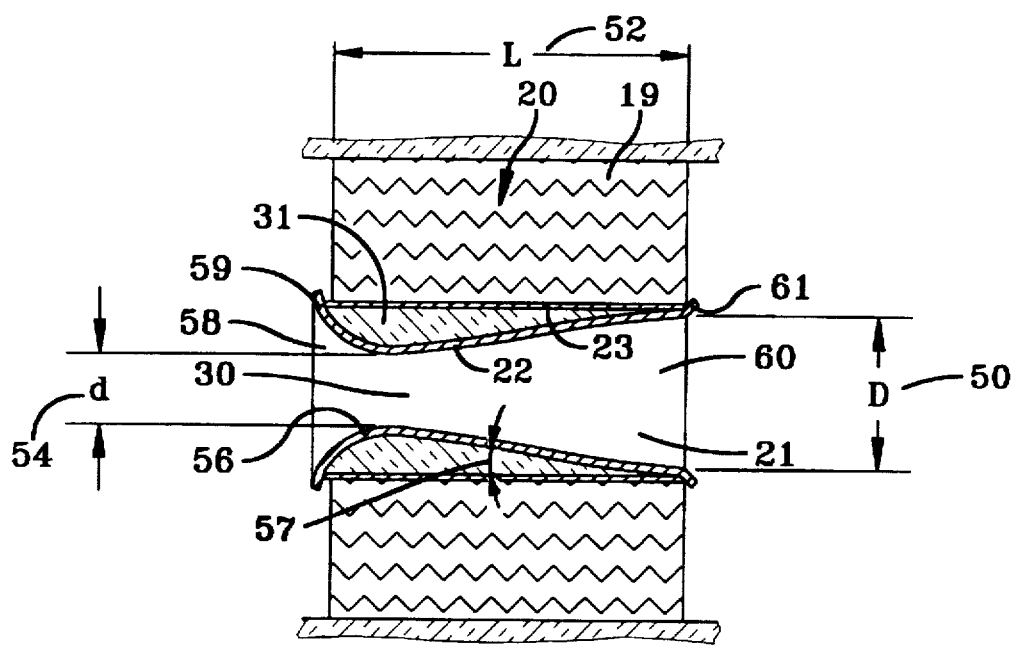
FIG. 2 illustrates an enlarged view of a portion of an example exhaust gas management apparatus according to this invention.

Referring now also to FIG. 2, the shape of the air flow directing body 22 can be better understood. The air flow directing body 22 has an inlet end 58 and an outlet end 60 and therebetween defines a low pressure region 30 where the diameter 54 of the bypass passage 21 is its minimum size, smaller than the diameter 50 at the inlet end 58 and outlet end 60.

The structure of the hydrocarbon adsorber 20 may be achieved by forming a tubular air flow directing body 22 having longitudinal cross section as shown and then wrapping a metal monolith adsorber substrate around the body 22. The ends 59 and 61 of the body 22 may be flared out as shown to prevent the substrate 19 from moving with respect to the air flow directing body 22.

In a preferred example, insulation is provided annularly between the air flow directing body 22 and the substrate 19 by wrapping a ceramic fiber material or insulating material or insulating region 32 on the radial exterior of the body 22 and then providing substrate 19 on the radial exterior of the insulating material 32 (FIG. 1). In the alternative example shown in FIG. 2, a second tube 23 having a circular cylindrical shape of constant diameter is provided annularly around the air flow directing body 22 to define the insulation region 31, which may be filled with an insulating material or with air. The flared ends 59 and 61 prevent telescoping of the tube 23 with respect to the body 22.

In an example in which substrate 19 is a ceramic structure, it is slid into place around the outer tube 23 prior to formation of the flared end 61.

The shape of the air flow directing body 22 and the relative sizes of the diameters 54 and 50 and the diameter of the open end 38 of the air source tube 40 are preferably provided so that the following relations hold true:

$$d_{LP} = D_n + x*L/8,$$

where $0.51 < x < 2$; and $$D_{end} = 2*L*\tan(\theta) + d_{LP},$$

where $0° \leq \theta \leq 15°$, where $d_{LP}$ is the diameter 54 at the low pressure region of the bypass channel, $D_{end}$ is the maximum diameter 50 of the bypass channel, $D_n$ is the diameter of the opening of the end 38 of the air source pipe 40 and L is the overall length 52 of the bypass passage 21 and θ is a half angle 57 of the diffuser portion of the air flow directing body 22.

Figure 3:
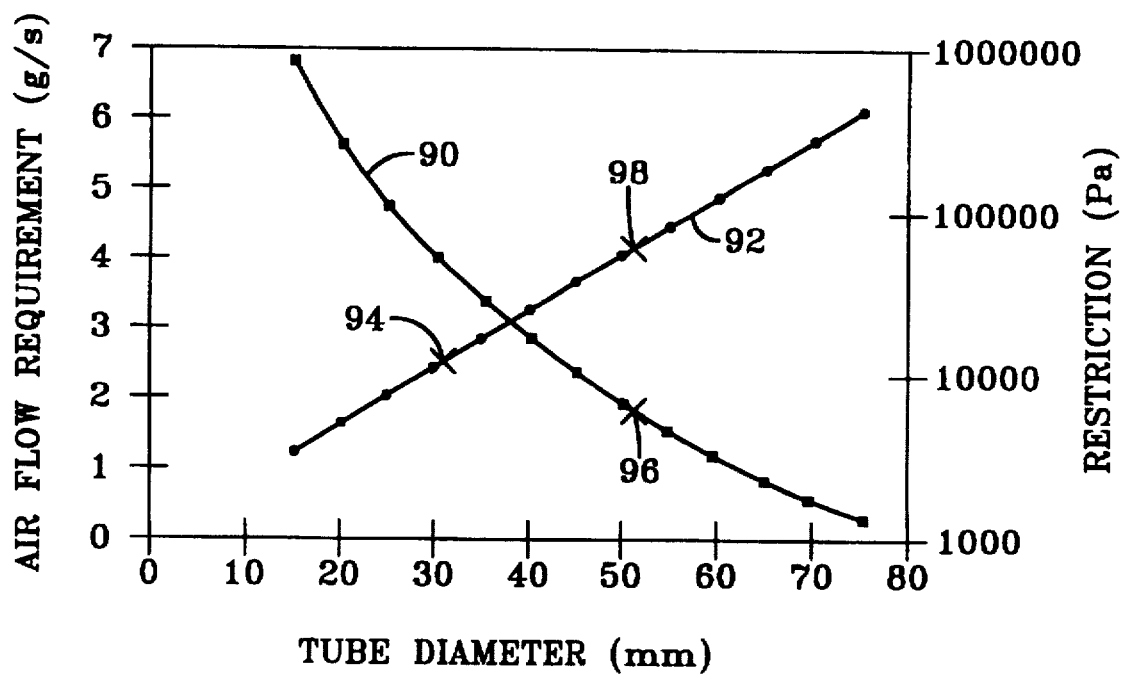
FIG. 3 is a graph depicting advantages of an example exhaust gas management apparatus according to this invention.

Referring now to FIG. 3, advantages of an example bypass channel 21 according to this invention are illustrated. The trace 90 in the graph represents the restriction of a straight tube bypass channel such as taught by the prior art in relation to tube diameter for an example flow rate of 125 g/s of exhaust gases at 800° C. Trace 90 illustrates that, as the tube diameter increases, the restriction to gas flow decreases. Trace 92 represents the necessary rate of air flow forced through end 38 of air source pipe 40 to effectively valve closed a bypass tube of constant diameter and force the gas to flow through the surrounding monolith having a 250 Pa restriction. Trace 92 illustrates that as the diameter of the straight bypass tube increases, more air flow from the air source is required to valve closed the tube. References 96 and 98 illustrate that for a straight bypass tube diameter of 50 mm, which provides a suitably low flow restriction, the air source must provide air flow at a rate of 4 g/s to valve shut the bypass tube to force the gas to flow through the surrounding monolith having the 250 Pa restriction.

However, using the air flow directing body 22 shown in FIGS. 1 and 2 with a minimum diameter 54 of 32 mm and with the open end 38 aimed at the low pressure region 30, the low restriction indicated by reference 96 when the valve is opened is maintained while the air flow rate required by the open end 38 to valve shut the bypass passage is reduced significantly to about 2.6 g/s (reference 94). This represents approximately a 40% reduction in air flow required to valve shut the bypass passage without any reduction in the flow restriction to the exhaust gasses flowing through the bypass when the bypass is valved open.

As can be seen, substantial advantage is provided by the air flow directing body 22 allowing use of a lower capacity air pump to effectively valve shut the bypass passage while not increasing the restriction to exhaust gasses through the catalytic converter.

Figure 4:
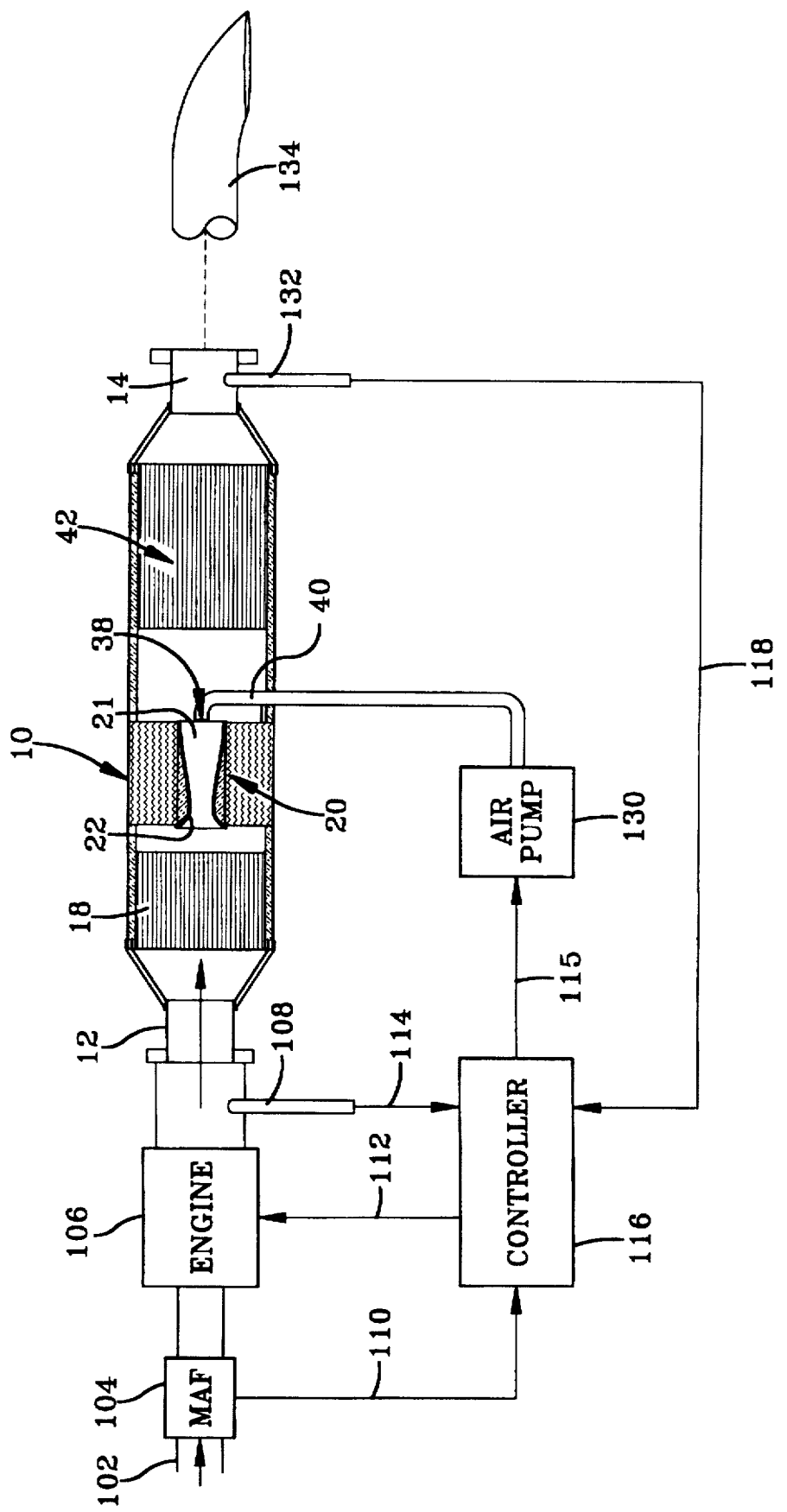
FIG. 4 illustrates an example exhaust gas management apparatus according to this invention.

Referring now to FIG. 4, an example control system for use with the catalytic converter 10 is shown. Ambient air flows through intake ducts 102, past mass air flow sensor 104 and into the engine 106. The mass air flow sensor 104 provides a signal on line 110 to controller 112 to indicate the amount of mass air flow into the engine 106. In response to the signal on line 110 and other known signals, controller 116 provides commands through line 112 to the engine 106 to control fueling and other operations of the engine 106 in a known manner of engine control. Exhaust gas out of the engine 106 passes a first oxygen sensor 108 of a known type that provides a signal on line 114 to the controller 116. The exhaust gasses then flow into the catalytic converter 10, which performs the desired hydrocarbon storage and catalyzing functions. Exhaust gasses flowing through the outlet 14 of the catalytic converter 10 eventually exit the vehicle via the exhaust gas tail pipe 134. Oxygen sensor 132 measures the oxygen content of the exhaust gasses exiting the catalytic converter 10 and provides a signal indicative thereof through line 118 to the controller 116. In response to the signals on lines 110, 114 and 118, the controller 116 controls the air pump 130 through control signals on line 118 to control the flow of ambient air through the tube or pipe 40, out of the open end 38 located within the catalytic converter 10.

In general, the air pump 130 is controlled as follows. Immediately upon start-up of the vehicle, the air pump 130 is activated by control signals on line 115 in response to signals on line 110 indicating the mass air flow into the engine 106. The flow rate through the pump is continually updated to maintain the bypass channel or passage 21 of the adsorber 20 closed until the first catalyst substrate 18 reaches light off temperature. As the speed of engine 106 changes, affecting the mass air flow into the engine, the rate of air exiting pump 130 into the catalytic converter 10 is continually updated to maintain the bypass channel 21 closed while simultaneously preventing the introduction of additional air into the adsorber 20. This prevents the lowering of the hydrocarbon partial pressure in exhaust gasses flowing through the adsorber 20, which would reduce the efficiency of the adsorber 20.

Once the front catalyst or first catalyst substrate 18 reaches light-off temperature, the air pump 130 is deactivated, valving open bypass passage 21, and is placed in a control mode responsive to the oxygen sensor 132. The determination of whether the front catalyst 18 has reached light off temperature may be made either on a statistical basis using a timer set in response to known data indicating typical time for a front catalyst 18 to reach light off temperature or may be made responsive to the signals on line 118 from exhaust oxygen sensor 132.

Since catalyst or second catalyst substrate 42 reaches light-off temperature later than firs catalyst substrate 18, there is a delay period between the valving open of bypass passage 21 and the light-off of second catalyst substrate 42. During this delay period, the hydrocarbon adsorber 20 maintains storage of hydrocarbons previously absorbed therein during the time period before front catalyst 18 reached light-off temperature. The release (desorption) of hydrocarbons from the adsorber 20 is a function of adsorber temperature and by implementing an annular insulating region 32 (FIG. 1) or 31 (FIG. 2) around the bypass passage, the transfer of heat to the adsorber 20 is reduced after the bypass passage 21 is valved open. This slows the heating of adsorber 20 to the temperature at which stored hydrocarbons will begin releasing, giving second catalyst substrate 42 longer time to reach light-off temperature. Thermally coupling the adsorber 20 to the housing 26, i.e., brazing the monolith to the housing, also slows the heating of the adsorber 20 by providing a path for heat flow out of adsorber 20. The insulating region 31, 32 also keeps more heat in the exhaust gas flowing to second catalyst substrate 42, providing for quicker light-off of second catalyst substrate 42.

Once the adsorber 20 begins releasing hydrocarbons, control of air pump 130 is provided in response to sensor 132 to introduce sufficient ambient air into the catalytic converter 10 to react in the second catalyst substrate 42 with the hydrocarbons releasing from the adsorber 22. At this point, second catalyst substrate 42 has reached light-off temperature. If desired, after the second catalyst substrate 42 reaches light-off temperature, air pump 130 is activated to force air out of air source 38, upstream through the bypass passage 21 and into the adsorber 20 to stimulate release of the hydrocarbons from the adsorber 20, thereby achieving a purge the adsorber 20.

Figure 5:
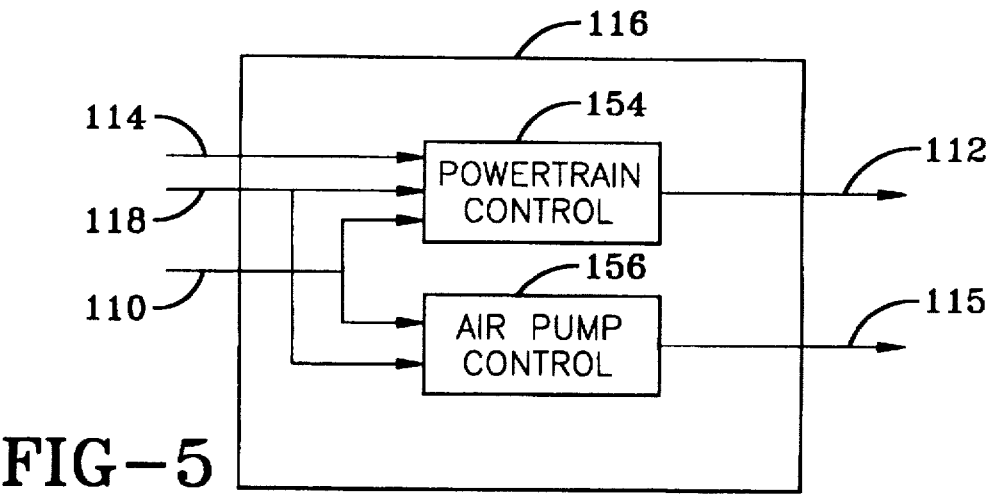
FIG. 5 illustrates schematically an example control of controller 116 in FIG. 4.

Referring now to FIG. 5, an example of the control within controller 116 is shown. The signal on line 110 from the mass air flow sensor 104 is provided along with the signals on lines 114 and 118 to the power train control 154 and to the air pump control 156. The power train control 154 controls the vehicle engine and other power train functions in a known manner and details thereof need not be set forth herein. The air pump control 156 responds to the oxygen sensor signal and the mass air flow signal to provide the control signal on line 115 to the air pump 130.

Figure 6:
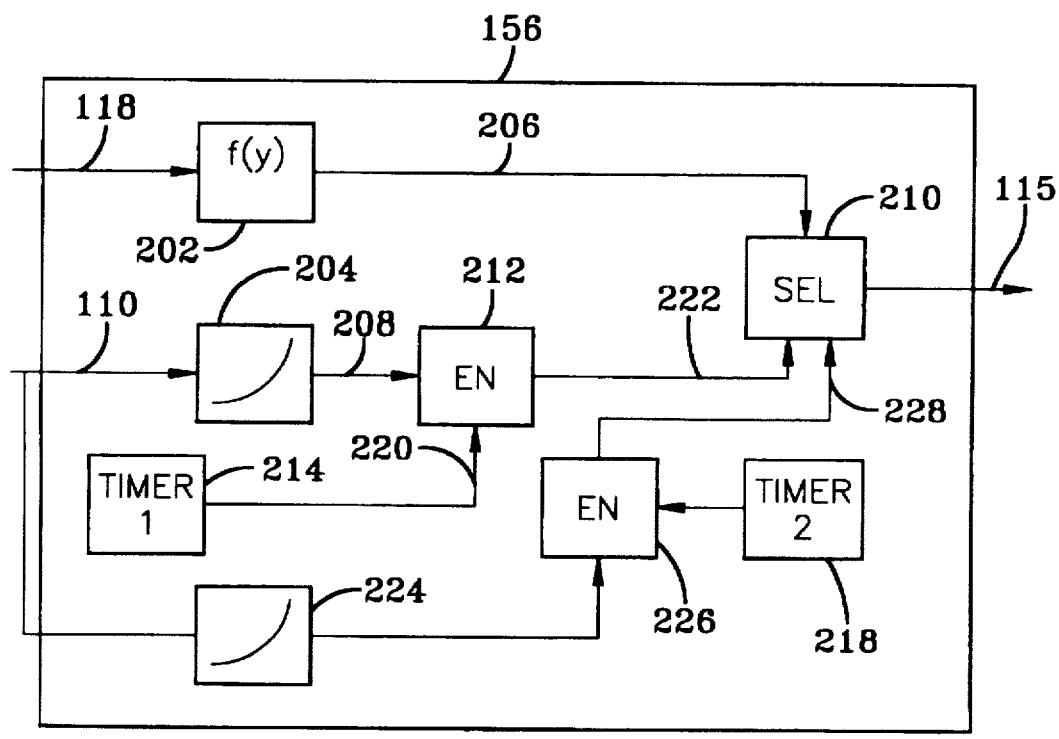
FIG. 6 illustrates schematically an example of the air pump control 156 of FIG. 5.

Referring now to FIG. 6, an example air pump control 156 is shown. The control 156 responds to the mass air flow through the engine, via the non-linear function 204 to provide a signal on line 208 containing a pump motor command designed to valve shut the bypass valve 21 while not introducing significant ambient air into the adsorber 20. The appropriate nonlinear function for block 204 can be easily determined by one skilled in the art on a test vehicle in which, for a series of given detected mass air flows, the air pump is adjusted until the optimum point is reached to valve shut the bypass passage 21 while not introducing additional air to the adsorber 20. The optimum points can then be stored in relation to the mass air flow signal in a look-up table, which is used as the non-linear function 204 in the air pump control 156. The signal on line 208 is enabled to line 222 and block 210 only when timer 214 provides an enabling signal on line 220 to enablement block 212.

An independently determined pump motor command is provided by block 202 in response to the signal on line 118 from the oxygen sensor 132 downstream of the catalysts 18 and 42 and of adsorber 20. Block 202 provides an air pump command intended for air pump operation after both catalysts 18 and 42 have reached light off temperature to control the introduction of supplemental atmospheric air into the catalytic converter to provide stoichiometric conditions to the gasses entering catalyst 42.

The function at block 202 will vary depending on the type of oxygen sensor 132 provided. For example, when oxygen sensor 32 is a wide range oxygen sensor, the function 202 may be a standard proportional derivative control function responsive to indications of fuel rich conditions within the catalytic converter 10 so that the command on line 206 introduces additional air into the catalytic converter only until the fuel rich condition is eliminated and the conditions are returned to stoichiometry. If the sensor 132 is a step-function sensor, indicating a step function at stoichiometric condition, then the function at block 202 can be implemented to increase the air pump speed in relation to the time that a fuel rich condition is indicated by sensor 132 until the fuel-rich condition is eliminated and the system is returned to stoichiometry.

The function block 224 may be provided to implement purging of the adsorber 20 after both catalysts 18 and 42 reach light-off temperature. The command output from block 224 may depend upon mass air flow into the engine as indicated by the signal on line 110 or may be a fixed command to force high amounts of supplemental air into the catalytic converter 10. The command from block 224 is enabled to block 210 only when timer 218 provides the appropriate command to enablement block 226. In general, the command from block 224 is enabled only after both catalysts 18 and 42 have reached light-off temperature, the output of timer 218 being set to go high at a time longer than a typical catalyst 42 takes to reach light off. As an alternative to timer 218, the enablement block 226 can be controlled based on the output of a temperature probe or one or more oxygen sensors indicating that catalyst or second catalyst substrate 42 has acquired light-off temperature. The command from block 224 is enabled to block 210 only for a time period long enough for the adsorber 20 to be purged, at which time the command from block 224 is again disabled.

Block 210 selects to line 115 the maximum of the commands from lines 206, 222 and 228 to control the air pump 130.

Figure 7:
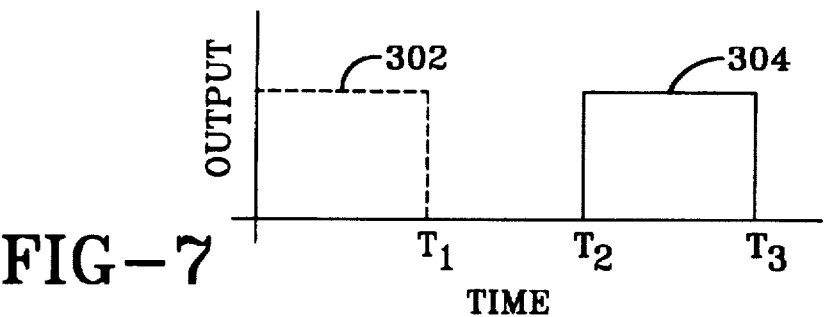
FIG. 7 illustrates an example timing diagram for use with the control shown in FIG. 6.

Referring now also to FIG. 7, the function of the timers 214 and 218 are indicated. Reference 302 indicates the enabling signal from timer 214, which goes high at vehicle start-up and goes low at time $T_1$, calibrated sufficiently long enough that catalyst 18 reaches light off temperature before signal 302 goes low. Reference 304 indicates the enabling signal of timer 218 that goes high at time $T_2$, which is sufficiently long enough after vehicle start-up that catalyst 42 has reached light-off temperature before signal 304 goes high. Signal 304 goes low at time $T_3$, such that the time period between $T_2$ and $T_3$ is sufficiently long to allow purging of the adsorber 20 by the ambient air introduced into the catalytic converter 10 from air pump 130.

In the above example, the signal on line 115 controls the air pump 130 to vary the air rate provided out of end 38 of air source pipe 40. In an alternative example, the motor for the air pump 130 is run at a constant speed and the air rate through air source pipe 40 is controlled by modulation of a gating valve. Example techniques for gating valve modulation suitable for implementation of the control functions described herein are known to those skilled in the art.

We claim:

1. An exhaust gas management apparatus comprising:
   an air flow directing body forming a bypass passage including an inlet end and an outlet end and defining a region located between the inlet end and the outlet end and having a first diameter smaller than second and third diameters of the inlet and outlet ends, respectively;
   a hydrocarbon adsorber mounted radially exterior of the air flow directing body;
   an air source located downstream in an exhaust flow path of the region having the first diameter; and
   an air pump coupled to the air source forcing air through the air source wherein, during activation of the pump, the bypass passage is valved shut at the region having the first diameter, wherein a first air flow rate of the air forced through the air source is required to valve shut the bypass passage at the region having the first diameter, wherein the first air flow rate is less than a second air flow rate that would be required to valve shut the bypass passage at a location within the bypass passage other than the region located between the inlet end and the outlet end and having the first diameter.

2. An exhaust gas management system according to claim 1, also comprising:
   a downstream catalyst substrate located downstream in the exhaust flow path of the hydrocarbon adsorber; and
   an annular insulation region located radially exterior of the air flow directing body and radially interior of the hydrocarbon adsorber, wherein the annular insulation region insulates the hydrocarbon adsorber from an exhaust gas from an internal combustion engine flowing through the bypass passage, increasing an amount of time that the hydrocarbon adsorber retains hydrocarbons absorbed after start-up of the internal combustion engine and decreasing an amount of time that the downstream catalyst substrate takes to reach a light-off temperature after start-up of the internal combustion engine.

3. An exhaust gas management apparatus according to claim 1, also comprising:
   an electronic controller that contains a signal indicative of a mass air flow into an internal combustion engine;
   an upstream catalyst substrate located upstream in the exhaust flow path of the hydrocarbon adsorber, wherein the electronic controller is coupled to the air pump, wherein, after start-up of the internal combustion engine, the controller controls an air flow output by the air pump responsive to the mass air flow indicated by the signal, wherein the first air flow rate from the air source is continually updated responsive to the mass air flow into the internal combustion engine to maintain the bypass passage valved shut until the upstream catalyst substrate reaches a light-off temperature.

4. An exhaust gas management apparatus according to claim 3, wherein, prior to the upstream catalyst substrate reaching the light-off temperature, the controller controls the air pump so that the air forced through the air source does not cause desorption of the hydrocarbon adsorber.

5. An exhaust gas management apparatus according to claim 3, also comprising:

a downstream catalyst substrate located downstream in the exhaust flow path of the hydrocarbon adsorber, wherein after the downstream catalyst substrate reaches the light-off temperature, the controller controls the air pump, increasing the first air flow rate to purge hydrocarbons stored by the adsorber prior to the upstream catalyst substrate reaching the light-off temperature.

6. An exhaust gas management apparatus according to claim 1, wherein the air flow directing body comprises a first elongated tube with a varying diameter defining the inlet end, the outlet end and the region having the first diameter, also comprising:

a second tube with a substantially constant diameter over the axial length thereof, wherein the second tube is concentric with and coaxial with the first tube and located radially exterior of the first tube, wherein an annular insulation space is provided between the first and second tubes.

\* \* \* \* \*